A. J. TYLER.
HOSE-COUPLING.

No. 174,988. Patented March 21, 1876.

WITNESSES
Henry N. Miller
C. K. Evert
By

INVENTOR
Aaron J. Tyler,
Alexander Mason
Attorney

N. PETERS, PHOTO-LITHOGRAPHER, WASHINGTON, D.C.

UNITED STATES PATENT OFFICE.

AARON J. TYLER, OF GENESEO, ASSIGNOR OF ONE-HALF HIS RIGHT TO E. E. SILL, OF BUFFALO, NEW YORK.

IMPROVEMENT IN HOSE-COUPLINGS.

Specification forming part of Letters Patent No. 174,988, dated March 21, 1876; application filed August 14, 1875.

*To all whom it may concern:*

Be it known that I, AARON J. TYLER, of Geneseo, in the county of Livingston and in the State of New York, have invented certain new and useful Improvements in Hose-Couplings; and do hereby declare that the following is a full, clear, and exact description thereof, reference being had to the accompanying drawings, and to the letters of reference marked thereon, making a part of this specification.

The nature of my invention consists in the construction and arrangement of a hose-coupling, as will be hereinafter more fully set forth.

In order to enable others skilled in the art to which my invention appertains to make and use the same, I will now proceed to describe its construction and operation, referring to the annexed drawing, in which—

Figure 1:
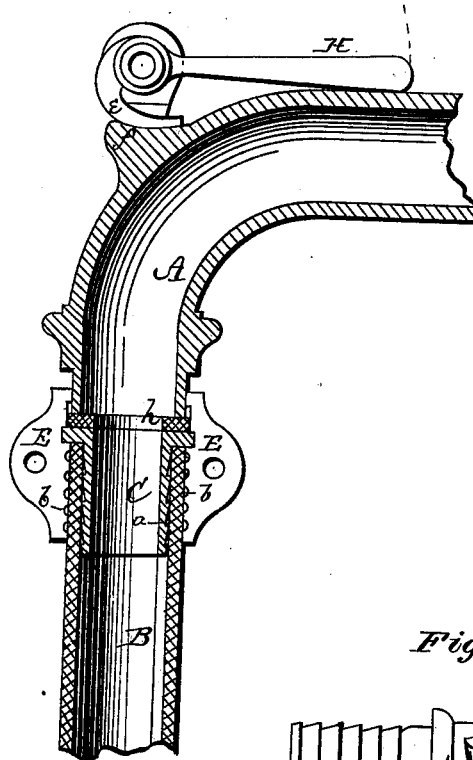
Figure 2:
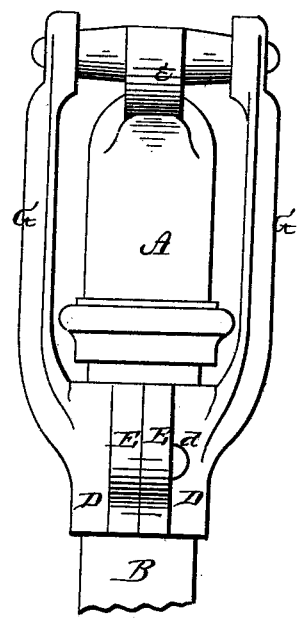
Figure 3:
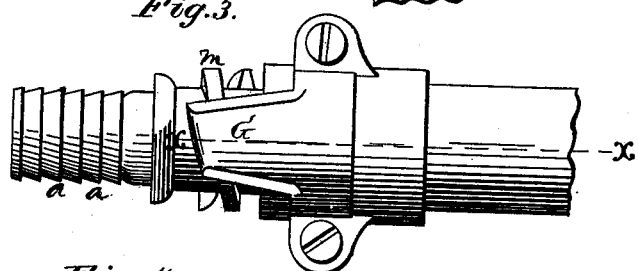

Figure 1 is a longitudinal section, and Fig. 2 a front view, of my coupling, showing its application to a curved spout. Fig. 3 is a side view; and Fig. 4, a longitudinal section, showing the application of my invention to straight spouts, or for coupling two pieces of hose together.

A represents the curved spout of a pump, to which it is desired to couple a hose, B. The coupling is composed of a flanged tube, C, provided with exterior circumferential teeth or bent offsets $a$ $a$, which is inserted in the hose B, and the hose then clamped by means of two semi-tubular pieces, D D, which have grooves $b$ $b$ around their inner circumference, and provided with projecting ears or flanges E E at their ends. These ears or flanges are then fastened together by bolts or screws $d$ $d$, thereby firmly clamping the hose on the interior tube C. From the center of each clamp D extends an arm, G, upward for a suitable distance, and between the upper ends of the two arms is pivoted a lever, H, the pivot end of which is formed with a cam, $e$. On the outer side of the spout A is formed a lug or projection, $f$, as shown in Fig. 1.

When the hose is to be coupled to the spout it is first clamped, as above described, the clamps extending a suitable distance beyond the outer flanged end of the tube C. A packing-ring, $h$, is then placed on the flanged end of said tube, and the coupling placed on the end of the spout, when, by throwing the lever H inward over the top part of the spout, the cam $e$ will operate against the projection $f$ and firmly draw the parts together, making a water-tight joint.

To uncouple the hose it is only necessary to throw the lever H outward again, when the hose will be free.

If the hose should break, the clamps can easily be removed, the hose cut off, and the flanged tube C inserted again, and the hose then clamped thereon, as before.

Figure 4:
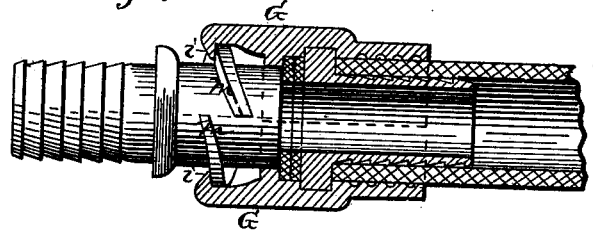

When the hose is to be coupled to a straight spout, as shown in Figs. 3 and 4, the same flanged tube and clamps are used, but the arms G are made short and provided on their ends with inwardly-projecting inclined flanges $i$ $i$, and the spout is provided with screw-flanges $m$ $m$, for the flanges $i$ to ride on, and thus screw the parts together.

This form of my invention may be used for uniting or coupling two pieces of hose together by having the screw-flanges $m$ on one clamp, and the arms with inclined flanges on the other.

Having thus fully described my invention, what I claim as new, and desire to secure by Letters Patent, is—

The combination of the interior flanged and toothed tube C, the grooved clamps D, provided with ears E and fastened by bolts or screws $d$, the arms G G, projecting from the clamps, lever H, with cam $e$, and spout A, with projection $f$, all substantially as and for the purposes herein set forth.

In testimony that I claim the foregoing I have hereunto set my hand and seal this 5th day of August, 1875.

A. J. TYLER. [L. S.]

Witnesses:
 C. L. EVERT,
 C. O. BEACH.